United States Patent
Jung et al.

(10) Patent No.: US 10,100,725 B2
(45) Date of Patent: Oct. 16, 2018

(54) CONNECTING ROD FOR INTERNAL COMBUSTION ENGINE WITH VARIABLE COMPRESSION ECCENTRICAL ELEMENT ADJUSTMENT DEVICE

(71) Applicant: ECO Holding 1 GmbH, Marktheidenfeld (DE)

(72) Inventors: Christian Jung, Eisenhuettenstadt (DE); Alexander Mudra, Goerlitz (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 60 days.

(21) Appl. No.: 15/431,963

(22) Filed: Feb. 14, 2017

(65) Prior Publication Data
US 2017/0268420 A1 Sep. 21, 2017

(30) Foreign Application Priority Data

Mar. 16, 2016 (DE) .......................... 10 2016 104 814
Sep. 22, 2016 (DE) .......................... 10 2016 117 875

(51) Int. Cl.
*F02B 7/06* (2006.01)
*F02B 75/04* (2006.01)
(Continued)

(52) U.S. Cl.
CPC ............ *F02B 75/045* (2013.01); *F02D 15/02* (2013.01); *F16C 7/06* (2013.01)

(58) Field of Classification Search
CPC ........... F16C 75/045; F16C 7/06; F02D 15/02
(Continued)

(56) References Cited

U.S. PATENT DOCUMENTS 2,989,954 A * 6/1961 Hulbert ................... F02B 75/04
  123/48 B
9,784,305 B2 * 10/2017 Wittek ...................... F16C 7/06
(Continued)

FOREIGN PATENT DOCUMENTS

DE     102011108790         1/2013
DE     102013206512 A1     10/2014
(Continued)

*Primary Examiner* — Marguerite McMahon
(74) *Attorney, Agent, or Firm* — Von Rohrscheidt Patents

(57) ABSTRACT

A connecting rod for an internal combustion engine with variable compression with an eccentrical element adjustment device for adjusting an effective connecting rod length, the connecting rod including a connecting rod body; and a connecting rod cover arranged at the connecting rod body, wherein the connecting rod body and the connecting rod cover envelop a crank bearing eye, wherein the eccentrical element adjustment device includes two cylinders with a respective piston that is displaceably supported in a respective cylinder bore hole and connected with a respective support rod, wherein a respective inlet is provided for supplying hydraulic fluid to each of the two cylinders, wherein a respective outlet is provided for draining the hydraulic fluid from each of the two cylinders, wherein the connecting rod body includes at least two connecting rod body grooves for connecting each respective inlet with a hydraulic fluid loop, wherein the at least two connecting rod body grooves are arranged so that a highly loaded portion of the connecting rod bearing eye is not provided with the at least two connecting rod body grooves.

16 Claims, 4 Drawing Sheets

(51) Int. Cl.
*F02D 15/02* (2006.01)
*F16C 7/06* (2006.01)

(58) Field of Classification Search
USPC .............................................. 123/48 B, 78 E
See application file for complete search history.

(56) References Cited

U.S. PATENT DOCUMENTS

| | | |
|---|---|---|
| 2015/0152794 A1 | 6/2015 | Paul |
| 2015/0204236 A1* | 7/2015 | Paul ...................... F02B 75/044 |
| | | 123/48 B |
| 2015/0233288 A1* | 8/2015 | Paul ...................... F02B 75/045 |
| | | 123/48 B |
| 2015/0260094 A1* | 9/2015 | Wittek .................. F02B 75/045 |
| | | 123/48 B |
| 2015/0330298 A1* | 11/2015 | Paul ...................... F02B 75/045 |
| | | 123/48 B |
| 2016/0177997 A1* | 6/2016 | Ezaki ....................... F16C 7/06 |
| | | 123/48 B |

FOREIGN PATENT DOCUMENTS

| | | |
|---|---|---|
| EP | 2821619 | 1/2015 |
| WO | WO2015082722 A2 | 6/2015 |

\* cited by examiner

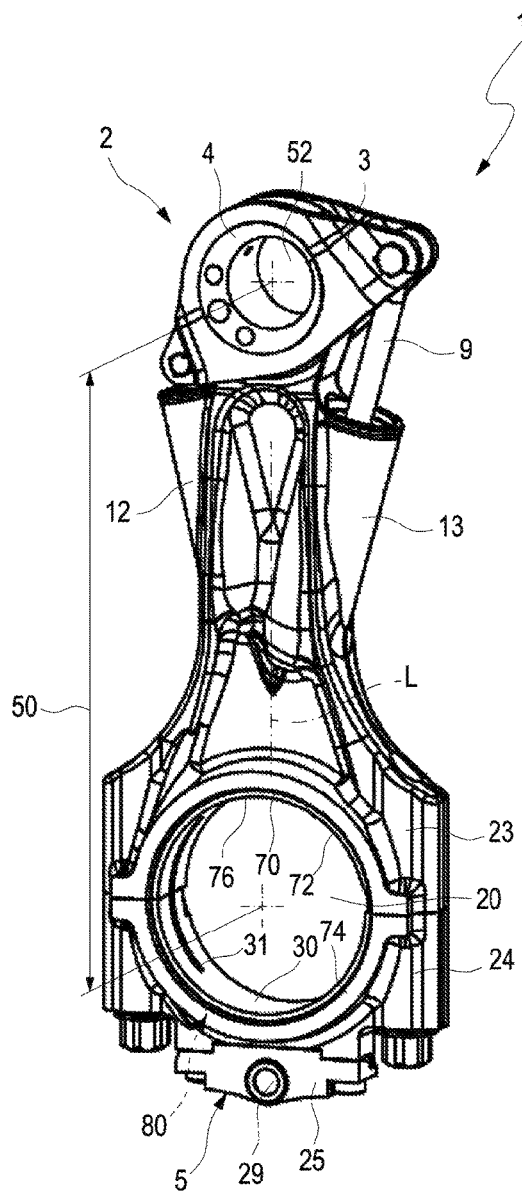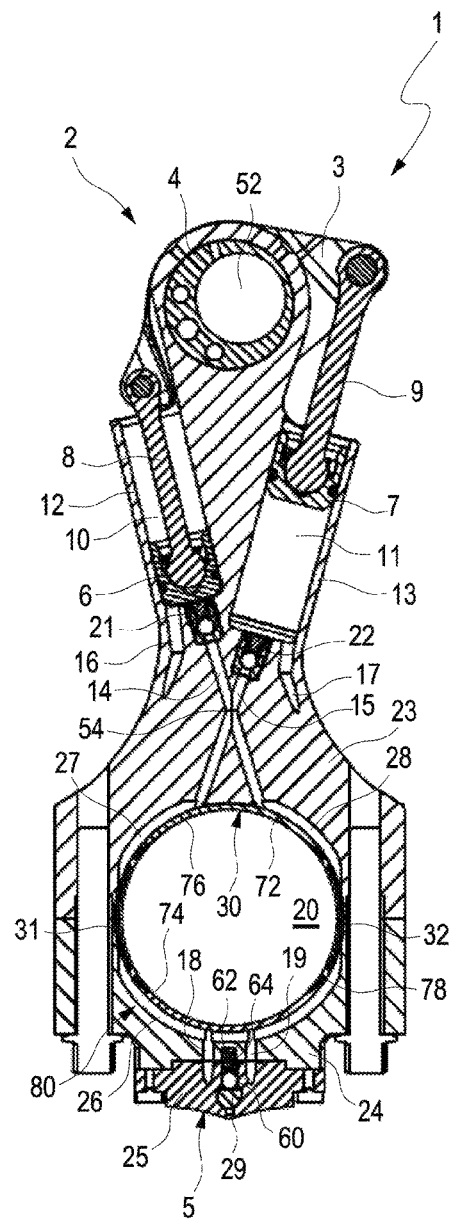
FIG. 5    FIG. 6

CONNECTING ROD FOR INTERNAL COMBUSTION ENGINE WITH VARIABLE COMPRESSION ECCENTRICAL ELEMENT ADJUSTMENT DEVICE

RELATED APPLICATIONS

This application claims priority from and incorporates by reference German Patent Applications DE 10 2016 104 814.3 filed on Mar. 16, 2016 and DE 10 2016 117 875.6 filed on Sep. 22, 2016.

FIELD OF THE INVENTION

The invention relates to a connecting rod for an internal combustion engine with variable compression with an eccentrical element adjustment device for adjusting an effective connecting rod length.

BACKGROUND OF THE INVENTION

In internal combustion engines a high compression ratio has a positive effect upon efficiency of the internal combustion engine. Compression ratio is generally referred to as a ratio of an entire cylinder volume before compression to a remaining cylinder volume after compression. In internal combustion engines with external ignition, for example gasoline engines which have a fixed compression ratio, the compression ratio however may only be selected up to a level so that a so called "knocking" of the internal combustion engine is avoided under full load operation. However, for much more prevalent partial load operation of the internal combustion engine, thus for a lower cylinder charge a combustion ratio with higher values can be selected without "knocking" occurring. The important partial load operation of the internal combustion engine can be improved when the compression ratio is variably adjustable. In order to adjust the compression ratio for example systems with a variable connecting rod length are known which actuate an eccentrical element adjustment device of a connecting rod using hydraulically or mechanically adjustable switch valves.

Connecting the connecting rod to a crank shaft of the internal combustion engine is performed through a crank bearing eye of the connecting rod, wherein a bearing shell is arranged between the crank bearing eye and a crank pin. A lubrication oil film can build up between the crank bearing eye and the crank pin.

BRIEF SUMMARY OF THE INVENTION

Loads in the crank bearing eye and the bearing shell are uneven so that increased wear occurs in highly loaded portions. Thus, it is an object of the invention to provide a connecting rod that is improved in this respect.

The object is achieved according to an aspect of the invention by a connecting rod for an internal combustion engine with variable compression with an eccentrical element adjustment device for adjusting an effective connecting rod length, the connecting rod including a connecting rod body; and a connecting rod cover arranged at the connecting rod body, wherein the connecting rod body and the connecting rod cover envelop a crank bearing eye, wherein the eccentrical element adjustment device includes two cylinders with a respective piston that is displaceably supported in a respective cylinder bore hole and connected with a respective support rod, wherein a respective inlet is provided for supplying hydraulic fluid to each of the two cylinders, wherein a respective outlet is provided for draining the hydraulic fluid from each of the two cylinders, wherein the connecting rod body includes at least two connecting rod body grooves for connecting each respective inlet with a hydraulic fluid loop, wherein the at least two connecting rod body grooves are arranged so that a highly loaded portion of the connecting rod bearing eye is not provided with the at least two connecting rod body grooves.

Advantageous embodiments and advantages of the invention can be derived from the additional patent claims, the description and the drawing figures.

A connecting rod for an internal combustion engine with variable compression with an eccentrical element adjustment device for adjusting an effective connecting rod length is proposed, the connecting rod including a connecting rod body and a connecting rod cover arranged thereon so that a crank bearing eye is enclosed. The eccentrical element adjustment device includes at least one advantageously two cylinders with a piston or a respective piston that is displaceably supported in a cylinder bore hole and connected with a support rod. Thus an inlet for feeding hydraulic fluid into the at least one cylinder and an outlet for draining the hydraulic fluid from the at least one cylinder is provided.

According to the invention the connecting rod element includes two grooves for connecting inlets with hydraulic fluid loop which are configured so that a highly loaded portion of the crank bearing eye is recessed.

Typically an inlet or outlet of hydraulic fluid for the cylinders which are provided for actuating the eccentrical element adjustment device through support rods leads away from a lower end of the cylinders oriented towards the crank bearing eye, so that the shortest connection for supplying the cylinders with the hydraulic fluid leads to the upper portion of the bearing shell of the crank bearing eye in the portion of the connecting rod. This portion of the bearing shell, however, is particularly highly loaded by the gas forces of the internal combustion engine. According to the invention, however, two grooves for supplying the inlets of the cylinders of the hydraulic fluid are arranged in the portion of the crank bearing eye which is arranged in the connecting rod body wherein the two grooves are arranged on both sides of the highly loaded portion of the bearing shell about the longitudinal axis of the connecting rod in order to better support the bearing shell through the connecting rod body in this highly loaded portion. The two grooves extend outside of the longitudinal axis of the highly loaded portion of the bearing shell away from the longitudinal axis. This avoids advantageously that the connecting rod eye includes too little material to effectively support the bearing shell since the grooves are arranged in the highly loaded portion of the bearing shell.

During operation of the connecting rod of an internal combustion engine it can occur, however, that only one of the two grooves in the bearing eye is connected with the hydraulic fluid in an unfavorable position of the crank shaft. In the connecting rod according to the invention, however, the two cylinders can still be supplied with the hydraulic fluid when the two inlets have an intersection so that a fluid connection between the two inlets is provided. Thus, both inlets can also be provided with the hydraulic fluid through a single groove. Alternatively it is also possible to provide an additional connecting groove in the crank bearing eye in the portion of the connecting rod cover and two additional grooves in the bearing shell on both sides of the connecting rod so that a fluid connection from one groove in the crank bearing eye in a portion of the connecting rod body through a lateral grove in the bearing shell through the connecting groove in the lift bearing eye in the portion of the connecting rod cover and through the second lateral groove in the bearing shell to the second groove in the crank bearing eyelet in the portion of the connecting rod body is provided. Thus, both grooves in the connecting rod eye in the portion of the connecting rod body and thus also both inlets of the two cylinders can be supplied with the hydraulic fluid. In another embodiment it would also be possible that the bearing shell includes a continuous groove which establishes a hydraulic connection of the two grooves of the crank bearing eye in the portion of the connecting rod element.

An advantageous embodiment of the supply bore holes in the crank shaft for the hydraulic fluid can be advantageously provided so that the respective groove of the inlet which requires hydraulic fluid at the moment is provided with the hydraulic fluid or even so that both grooves are always provided with the hydraulic fluid.

As described supra safe low wear operations of the connecting rod under a high load of the bearing shell of the crank bearing eye is possible while reliably providing the cylinders of the eccentrical element adjustment device with hydraulic fluid. Thus, a leakage compensation of hydraulic fluid in the cylinders and a returning or auctioning of hydraulic fluid due to different chamber sizes of the cylinders can be provided.

According to an advantageous embodiment at least two grooves that are offset from each other at the circumference of the crank bearing eye can be provided on a first portion of the inner circumference of the crank bearing eye in a portion of the connecting rod body to supply the inlets with the hydraulic fluid. Both grooves can be supplied with the hydraulic fluid so that inlets to the cylinders which are hydraulically connected with the grooves reliably facilitate feeding or draining hydraulic fluid to or from the cylinders. The two grooves can be advantageously arranged on an inner circumference of the crank bearing eye so that they are offset from each other so that a respective highly loaded portion of the crank bearing eye is not grooved so that it can provide sufficient support for the bearing shell. Thus, low wear operations of the connecting rod can be advantageously provided over the service life.

According to an advantageous embodiment the at least two grooves can be arranged offset from a center longitudinal axis of the connecting rod body. The two grooves for supplying the inlets of the cylinders with the hydraulic fluid can be advantageously arranged so that the grooves are arranged on both sides of the highly loaded portion of the bearing shell about the longitudinal axis of the connecting rod in order to better support the bearing shell through the connecting rod body in this highly loaded portion. The two grooves can be advantageously extend away from the longitudinal axis outside of the longitudinal axis of the highly loaded portion of the bearing shell. Thus, it is advantageously prevented that the crank bearing eye includes too little material to effectively support the bearing shell due to the arrangement of the grooves in the highly loaded portion of the bearing shell.

According to an advantageous embodiment each inlet can be respectively connected with each of the two grooves. This way it can be assured that both cylinders can supplied with the hydraulic fluid through the inlet during operation of the connecting rod when only one of the two grooves is supplied with the hydraulic fluid in an unfavorable position of the crank shaft since the inlets lead to both grooves. Thus, reliable operations of the eccentrical element adjustment device can be provided in all operating conditions.

According to an advantageous embodiment the inlets can include at least one intersection in the connecting rod body between the cylinders and the grooves so that a fluid connection is provided between the inlets at the intersection. An intersection of the two inlets facilitates a safe supply of both cylinders with the hydraulic fluid from both grooves since a fluid connection to both cylinders is thus provided and the hydraulic fluid can be distributed from one groove to both cylinders. Thus reliable operations of the eccentrical element adjustment device in all operating conditions can be provided.

According to an advantageous embodiment at least one connection groove can be provided at least one a second portion of the inner circumference of the crank bearing eye in a portion of the connecting rod cover, wherein the connecting groove is provided for hydraulically connecting the at least two grooves of the connecting rod body. Alternatively it is possible to provide an additional connecting groove in the crank bearing eye in the portion of the connecting rod cover so that a fluid connection is provided from a groove in the crank bearing eye in the portion of the connecting rod body through a lateral groove in the bearing shell through the connection groove in the crank bearing eye in the portion of the connecting rod cover and through the second lateral groove in the bearing shell to the second groove in the crank bearing eye in the portion of the connecting rod body. Thus, both grooves in the crank bearing eye in the portion of the connecting rod body and thus also both inlets of the two cylinders can be provided with the hydraulic fluid.

According to an advantageous embodiment a bearing shell can be arranged in the crank bearing eye wherein at least one, advantageously two grooves are arranged at least on a portion of the inner circumference of the bearing shell wherein the two grooves are provided to hydraulically connect the at least two grooves of the connecting rod body with each other. This way it is possible to provide two additional grooves in the bearing shell on both sides of the connecting rod so that a fluid connection is provided from one groove in the connecting rod eye in the portion of the connecting rod body through a lateral groove in the bearing shell through the connecting groove in the crank bearing eye in the portion of the connecting rod cover and through the second lateral groove in the bearing shell to the second groove in the crank bearing eye in the portion of the connecting rod body. Thus both grooves in the crank bearing eye in the portion of the connecting rod body and thus also both inlets of the two cylinders can be supplied with the hydraulic fluid.

According to an advantageous embodiment an adjustment travel of the eccentrical element adjustment device can be adjustable by a switch valve. A rotation of the adjustable eccentrical element adjustment device is initiated by an impact of mass and load forces of the internal combustion engine which impact the eccentrical element adjustment device during an operating stroke of the internal combustion engine. During an operating stroke the effective directions of the forces impacting the eccentrical element adjustment device change continuously. The rotating movement or the adjustment movement is supported by the pistons integrated in the connecting rod and loaded with hydraulic fluid, in particular with motor oil. The pistons prevent a reset of the eccentrical element adjustment device due to varying force effective directions of forces acting upon the eccentrical element adjustment device. Thus, a reliable adjustment of the effective connecting rod length can be achieved by the switch valve through the eccentrical element adjustment device in that the drains of the two cylinders in two switching positions are connected through the capture element with the hydraulic fluid loop, in particular the motor oil loop.

According to an advantageous embodiment the switch valve can be provided for controlling the hydraulic fluid flow wherein the switch valve is optionally movable into a first switching position or a second switching position so that the drain of the first cylinder is connected through the crank bearing eye of the connecting rod with the hydraulic fluid loop in the first switching position and the drain of the second cylinder is connected through the crank bearing eye of the connecting rod with the hydraulic fluid loop in the second switching position. Thus, the switch valve facilitates a reliable adjustment of the effective connecting rod length through the eccentrical element adjustment device in that the drains of the two cylinders are connected with the hydraulic fluid loop in two switching position respectively through the capture element.

According to an advantageous embodiment a valve housing of the switch valve can be arranged at or in the connecting rod body or the connecting rod cover. Depending on the installation space requirements for the connecting rod different arrangements of the valve housing of the switch valve at or in the connecting rod can be advantageous. In order to use the connecting rod in horizontally opposed internal combustion engines the switch valve can be advantageously provided in the connecting rod body laterally between a cylinder and the connecting rod bearing eye. Alternatively it is advantageous for using the connecting rod in inline engines to arrange the switch valve in the portion of the connecting rod or as an adapter solution below the connecting rod cover at an outside of the connecting rod cover.

According to an advantageous embodiment the valve housing can be provided as an adapter at the connecting rod cover. Thus it is possible to provide the switch valve according to the invention as a screw on adapter at the connecting rod cover which is advantageous due to space requirements when using the connecting rod in an inline engine. It is another advantage that the switch valve can thus be tested separately before being mounted to a connecting rod. When required the switch valve can be changed easily and replaced by another switch valve which can be hydraulically and not mechanically actuatable.

According to an advantageous embodiment the outlets of the cylinders can extend from the cylinder bore holes through the connecting rod body and the connecting rod cover and lead into drain conduits of the switch valve at a side of the connecting rod cover that is oriented away from the crank bearing eye. The drains can thus be run through the connecting rod body and when the connecting rod cover is mounted the drains can be run through the connecting rod cover so that they exit again at a bottom side of the connecting rod cover. This way the drains can lead into the switch valve that is arranged as an adapter at the bottom side of the connecting rod cover, thus the supply of the cylinders with the hydraulic fluid can be advantageously provided. By controlling the draining of the hydraulic fluid from the cylinders the eccentrical element adjustment device is effectively controllable by the switch valve.

According to an advantageous embodiment at least one conduit can be arranged in the connecting rod cover for connecting the switch valve with the connection groove of the crank bearing eye. Through the connection of the switch valve through the connecting groove of the crank bearing eye with the hydraulic fluid loop operations of the eccentrical element adjustment device are safely provided through the switch valve. Draining hydraulic fluid through the connecting groove of the crank bearing eye represents a simple, cost effective and reliable manner to establish the fluid connection between the switch valve and the hydraulic fluid loop.

According to an advantageous embodiment a capture element of the switch valve can be provided in the switch valve for controlling the hydraulic fluid flow wherein the switch valve is interlockable by a spring loaded interlocking element in both switching positions. Through the capture element in the first switching position the outlet of the first cylinder can be connected with the hydraulic fluid loop and in the second switching position the outlet of the second cylinder can be connected with the hydraulic fluid loop. Thus, the switch valve can provide a reliable adjustment of the effective piston rod length through the eccentrical element adjustment device in that the drains of the two cylinders are connected in both switching positions respectively through the capture element with the hydraulic fluid loop, for example the motor oil loop. Interlocking the capture element in the two switching positions through the spring loaded interlocking element represents a very simple and cost effective manner to assure the function of the switch valve. Thus, for example a ball loaded with a compression spring can be used as an interlocking element wherein the ball can interlock in two interlocking positions of the valve housing.

According to an advantageous embodiment the spring of the interlocking element after mounting the valve housing at the connecting rod cover can be provided at least partially supported in a recess of the connecting rod cover. The arrangement of at least a portion of the spring of the interlocking element in the connecting rod cover represents an installation space optimized solution for arranging the valve housing at the connecting rod cover. The valve housing can be provided flatter this way since the spring can be inserted into the recess of the connecting rod cover

BRIEF DESCRIPTION OF THE DRAWINGS

Additional advantages of the invention can be derived from the following drawing description. The drawings illustrate embodiments of the invention. The drawings, the description and the claims include multiple features in combination. A person skilled in the art will advantageously view the features individually and combine them into additional useful additional combinations, wherein:

FIG. 5 illustrates an isometric view of a connecting rod according to another embodiment of the invention;

FIG. 6 illustrates the connecting rod of FIG. 5 in a longitudinal sectional view;

DETAILED DESCRIPTION OF THE INVENTION

Figure 1:
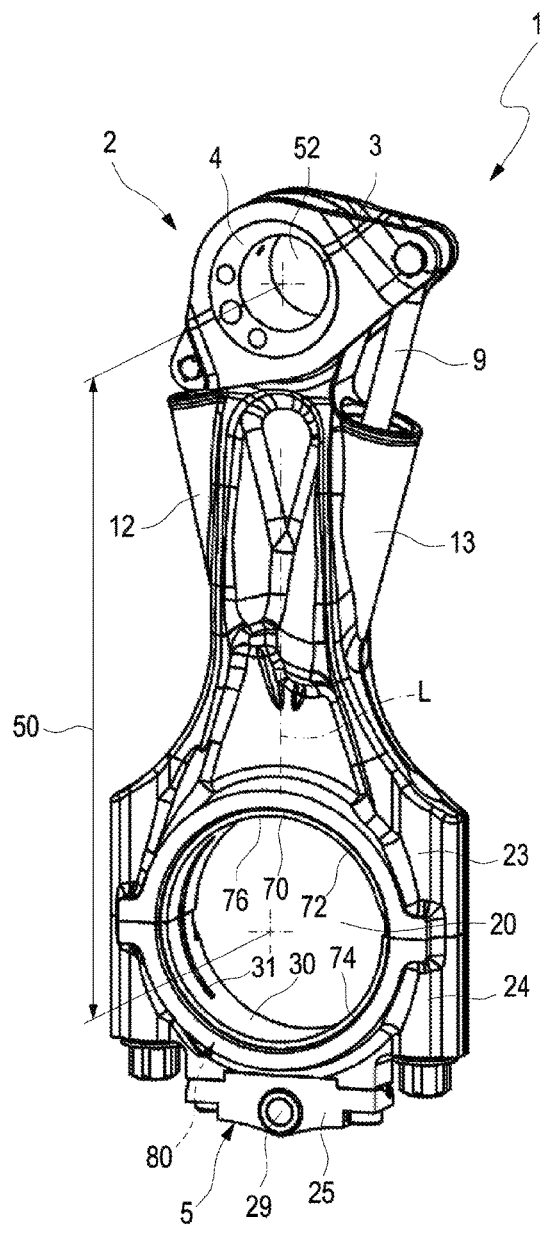
FIG. 1 illustrates an isometric view of a connecting rod according to an embodiment of the invention.

In the figures identical or like components are designated with identical reference numerals. The figures only illustrate exemplary embodiments and do not limit the scope and spirit of the invention.

Figure 2:
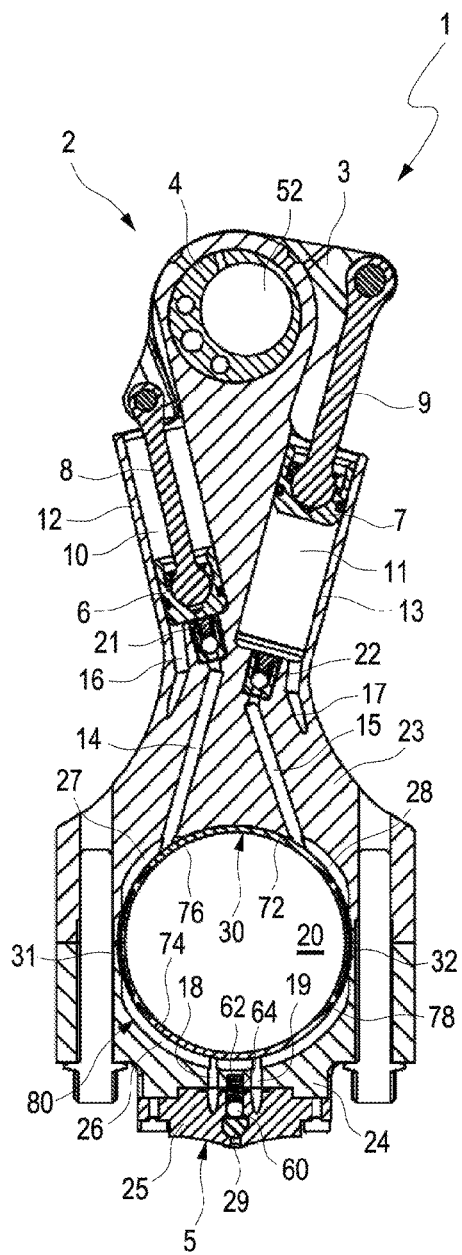
FIG. 2 illustrates the connecting rod of FIG. 1 in a longitudinal sectional view.
Figure 3:
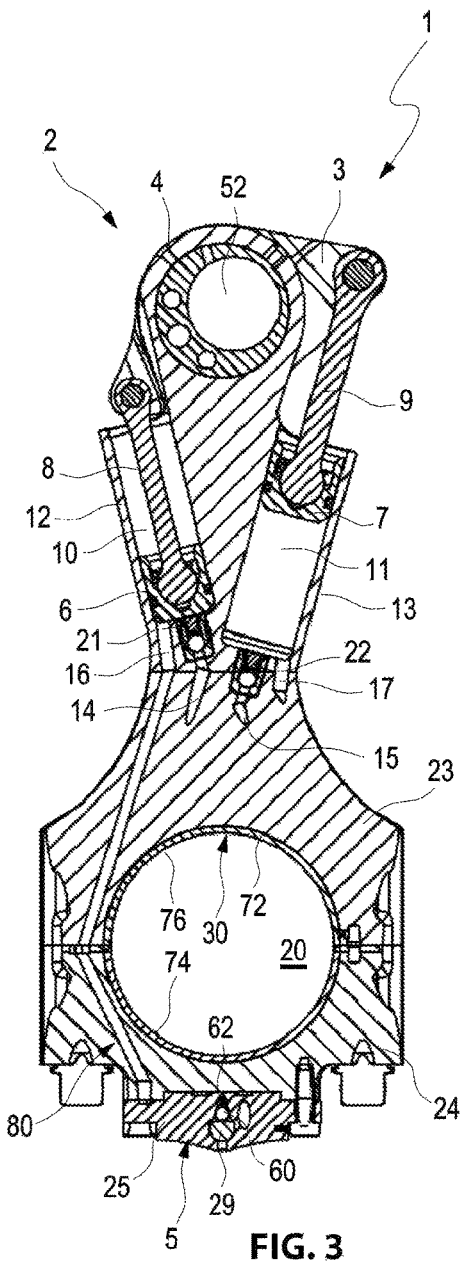
FIG. 3 illustrates the connecting rod of FIG. 1 in another longitudinal sectional view.
Figure 4:
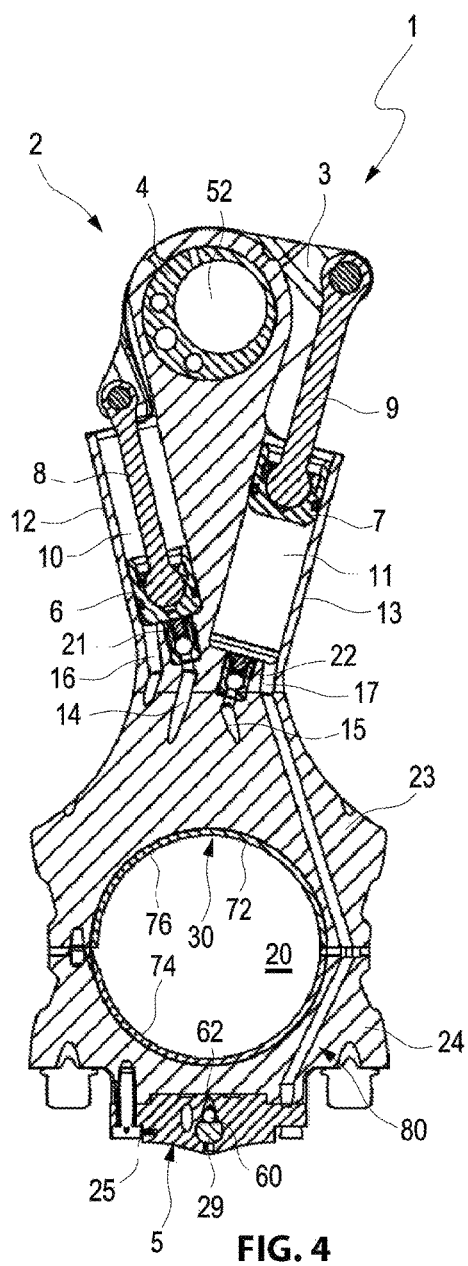
FIG. 4 illustrates the connecting rod of FIG. 1 in another longitudinal sectional view.

FIGS. 1-4 illustrate different views and sectional views of a first embodiment of a connecting rod 1 according to the invention for a variable compression internal combustion engine. FIG. 1 illustrates an isometric view whereas FIGS. 2-4 illustrate longitudinal sectional views in various depths of the connecting rod 1.

The connecting rod 1 includes a connecting rod body 23 and a connecting rod cover 24 arranged thereon, both of which enclose a crank bearing eye 20. The connecting rod 1 includes an eccentrical element adjustment device 2 for adjusting an effective connecting rod length 50 with an eccentrical element 4 which cooperates with a one component or multi component eccentrical element lever 3. Thus an adjustment travel of the eccentrical element adjustment device 2 is adjustable through a switch valve 5. An effective connecting rod length 50 is obtained as a distance of a center axis of the crank bearing eye 20 from a center axis of a bore hole of the eccentrical element 4 configured as connecting rod bearing eye 52.

The eccentrical element adjustment device 2 includes at least two cylinders 12, 13 respectively including a piston 6, 7 that is movably supported in a cylinder bore hole 10, 11 and connected with a support rod 8, 9. An inlet 14, 15 is respectively provided for feeding hydraulic fluid to the cylinders 12, 13 and an outlet 16, 17 for draining the hydraulic fluid from the cylinder 12, 13.

A rotation of the adjustable eccentrical element adjustment device 2 is initiated by an impact of mass and load forces of the internal combustion engine that become effective upon the eccentrical element adjustment device 2 during an operating stroke of the internal combustion engine. Effective directions of the forces impacting the eccentrical element adjustment device 2 change continuously during an operating stroke. The rotating movement or adjustment movement is supported by one or plural pistons 6, 7 that are loaded with hydraulic fluid in particular motor oil and integrated in the connecting rod 1, or the pistons 6, 7 prevent a reset of the of the eccentrical element adjustment device 2 based on varying force effective directions of forces impacting the eccentrical element adjustment device 2. The pistons 6, 7 are operatively connected with the eccentrical element lever 3 through support rods 8, 9.

As can be derived from FIG. 2 which shows a sectional view of the connecting rod 1 the pistons 6, 7 are respectively movably supported in the cylinder bore hole 10, 11 of a cylinder 12, 13. The cylinders 12, 13 can be provided as a separate component or can be provided integrally in one piece with a connecting rod body of the connecting rod 1. By the same token it is also conceivable as a matter of principle to provide the connecting rod 1 with only one cylinder and to use a double acting piston.

The pistons 6, 7 are movably supported in hydraulic chambers formed by the cylinder bore holes 10, 11 and loaded through the inlets 14, 15 from the crank bearing eye 20 with hydraulic fluid, (oil) through the check valves 21, 22. The check valves thus prevent a back flow of the hydraulic fluid from the hydraulic chambers back into the hydraulic fluid conduits into a multi component bearing shell 30 of the crank bearing eye 20 and facilitate suctioning hydraulic fluid into the hydraulic chambers.

The hydraulic chambers are furthermore connected through drains 16, 17 visible in FIGS. 3 and 4 with the switch valve 5. The drains 16, 17 run through a connecting rod body 23 and a connecting rod cover 24 arranged thereon in a direction towards a bottom side of the connecting rod 1 where a valve housing 25 of the switch valve 5 is connected as an adapter and lead into drain conduits of the switch valve 5. The switch valve 5, however, can also be integrally provided with the connecting rod cover or the connecting rod body 23.

At least one conduit connects the switch valve 5 with a connecting groove 26 of the crank bearing eye 20 in the portion of the connecting rod cover 24. The connecting groove 26 is arranged on a second portion 74 of the inner circumference 70 of the crank bearing eye 20 in a portion of the connecting rod cover 24.

As can be derived from FIG. 2 the illustrated embodiment provides two conduits 18, 19 for connecting the switch valve 5 with the connecting groove 26 and thus with the hydraulic fluid cycle 80 of the internal combustion engine. On the other hand side the connecting rod body 23 includes two groves 27, 28 in a portion of the lift bearing eye 20 wherein the two grooves connect the inlets 14, 15 with the hydraulic fluid cycle 80 and facilitate the suctioning in a direction towards the hydraulic chambers. The two grooves 27, 28 are provided offset from each other for supplying the inlets 14, 15 with hydraulic fluid on a first portion 72 of the inner circumference 70 of the lift bearing eye 20 in the portion of the connecting rod body 23 at a circumference 70 of the crank bearing eye 20.

Thus, according to the invention a highly loaded portion of the crank bearing eye 20 is recessed. The two grooves 27, 28 are thus arranged offset from a center longitudinal axis L of the connecting rod body 23. Thus, the grooves 27, 28 are arranged in a less loaded portion so that the highly loaded portion of the connecting rod eye 20 is not weakened by a groove anymore and available as a support surface for the bearing shell 30. Thus, the bearing shell 30 can be configured narrower.

The inlets 14, 15 are thus respectively connected with a groove 27, 28 and do not intersect in the connecting rod body 23. However through the bearing shell 30 (for example through the grooves 31, 32) and the connecting groove 26 in the connecting rod cover 24 there is a connection of the grooves 26, 27, 28 so that the two inlets 14, 15 can be supplied with the hydraulic fluid permanently. The connecting groove 26 is thus also provided for hydraulically connecting the at least two grooves 27, 28 of the connecting rod body 23. For this purpose at least one, advantageously two grooves 31, 32 are arranged at least on a portion 78 of an inner circumference 76 of the bearing shell 30 wherein the at least one groove is provided for hydraulically connecting the at least two grooves 27, 28 of the connecting rod body 23 with one another.

As Illustrated in FIG. 2 at least two grooves 27, 28 are provided at the circumference 70 of the connecting rod bearing eye 20 offset from each other at least on a first portion 72 of the inner circumference of the connecting rod bearing eye 20 in the portion of the connecting rod body 23 and configured to supply the inlets 14, 15 with hydraulic fluid. In order to improve the hydraulic fluid supply of the inlets 14, 15 in spite of the long supply paths hydraulic fluid supply bore holes in the crank shaft can be selected so that the groove 27, 28 whose associated inlet 14, 15 needs hydraulic fluid is supplied with the hydraulic fluid. Alternatively the hydraulic fluid supply bore holes of the crank shaft can be configured so that both grooves 27, 28 are permanently supplied with the hydraulic fluid.

The switch valve 5 according to the invention that is provided for controlling the hydraulic fluid flow is optionally displaceable into a first switching position or a second switching position wherein the outlet 16 of the first cylinder 12 is connected through the crank bearing eye 20 of the connecting rod 1 with the hydraulic fluid loop 80 in the first switching position and the drain 17 of the second cylinder 13 is connected through the crank bearing eye 20 of the connecting rod with the hydraulic fluid loop 80 in the second switching position. The switch valve 5 includes a capture element 29 which is arranged in the valve housing 25 and which is optionally displaceable into a first switching position or a second switching position wherein the capture element 29 connects the outlet 16 of the first cylinder 12 with an oil loop in the first switching position and the capture element 29 connects the outlet 17 of the second cylinder 13 with the oil loop in the second switching position. The capture element 29 that is provided in the switch valve 5 for controlling the hydraulic fluid flow is interlockable by a spring loaded interlocking element 60 in both switching positions.

The valve housing 25 of the switch valve 5 can be arranged at or in the connecting rod element 23 or the connecting rod cover 24. In both illustrated embodiments the valve housing 25 is arranged as an adapter at the bottom side of the connecting rod cover 24 for reasons of installation space. The outlets 16, 17 extend from the cylinder bore holes 10, 11 through the connecting rod body 23 and the connecting rod cover 24 and lead at a side of the connecting rod cover 24 that is oriented away from the crank bearing eye 20 into drain conduits of the shift valve 5. The spring 62 of the interlocking element 60 is at least partially supported in a recess 64 of the connecting rod cover 24 after the valve housing 25 is correctly mounted at the connecting rod cover 24. Thus, the valve housing 25 can be provided flatter.

Figure 7:
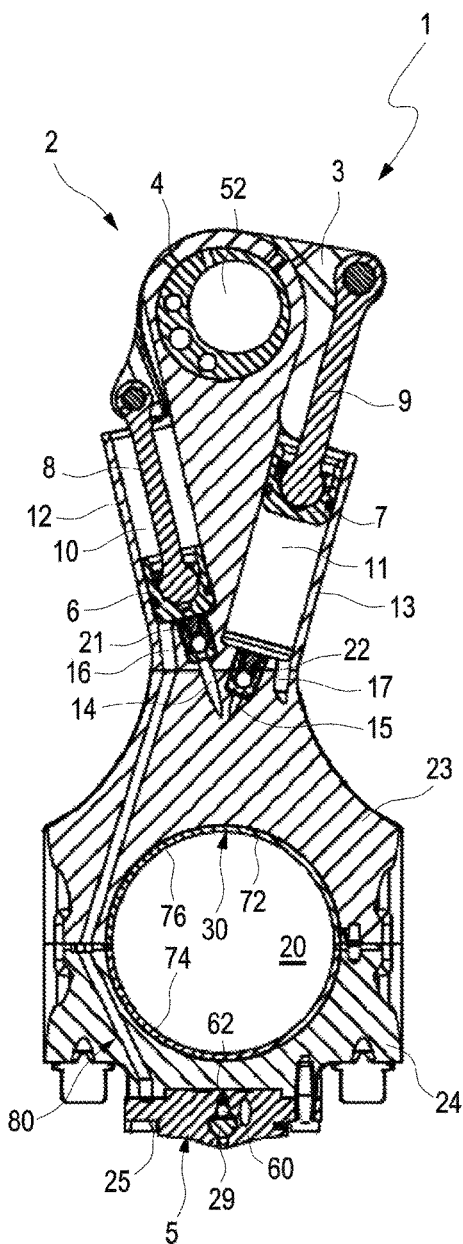
FIG. 7 illustrates the connecting rod of FIG. 5 in another longitudinal section view.
Figure 8:
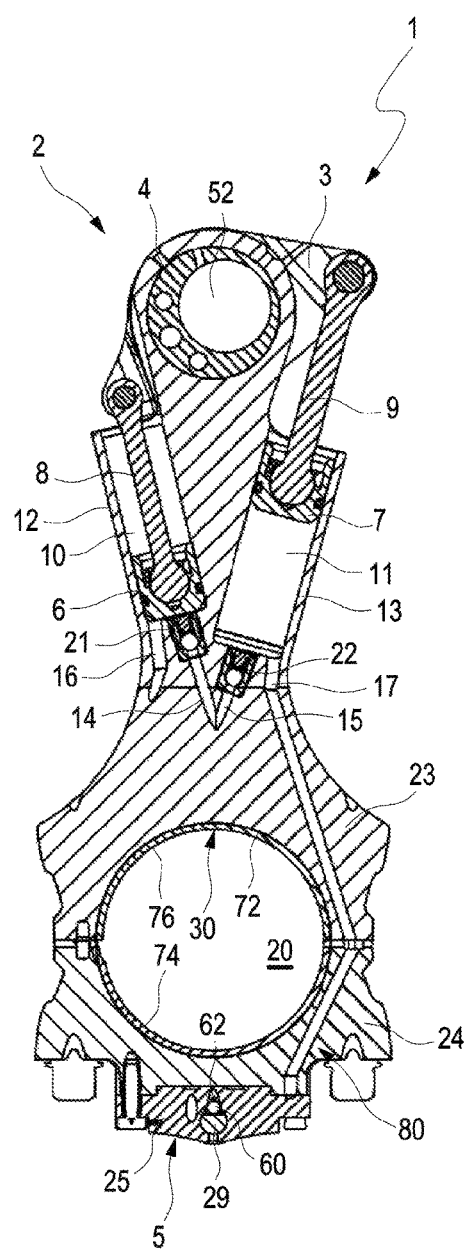
FIG. 8 illustrates a connecting rod of FIG. 5 in another longitudinal section view.

FIGS. 5-8 illustrate a second embodiment of a connecting rod 1 according to the invention. Thus, FIG. 5 illustrates an isometric view whereas FIGS. 6-8 illustrate longitudinal sectional views at different depths of the connecting rod 1.

This differs from the first embodiment merely in that the inlets 14, 15 intersect in the connecting rod body 23. The inlets 14, 15 include at least one intersection 54 in the connecting rod body 23 between the cylinders 6, 7 and the grooves 27, 28 so that a fluid connection is respectively provided between the inlets 6, 7 at the intersection 54. Thus, the inlets 14, 15 are respectively connected with both grooves 27, 28. Thus, a supply of the two cylinders 6, 7 with hydraulic fluid through the inlets 14, 15 can also be assured under unfavorable conditions when only one groove 27, 28 of the crank bearing eye 20 is supplied from the hydraulic fluid loop 80. The hydraulic fluid bore hole grooves in the crank shaft can thus be configured less complex.

What is claimed is:

1. A connecting rod for an internal combustion engine with variable compression with an eccentrical element adjustment device for adjusting an effective connecting rod length, the connecting rod comprising:
    a connecting rod body; and
    a connecting rod cover arranged at the connecting rod body,
    wherein the connecting rod body and the connecting rod cover envelop a crank bearing eye,
    wherein the eccentrical element adjustment device includes two cylinders with a respective piston that is displaceably supported in a respective cylinder bore hole and connected with a respective support rod,
    wherein a respective inlet is provided for supplying hydraulic fluid to each of the two cylinders,
    wherein a respective outlet is provided for draining the hydraulic fluid from each of the two cylinders,
    wherein the connecting rod body includes at least two connecting rod body grooves for connecting each respective inlet with a hydraulic fluid loop,
    wherein the at least two connecting rod body grooves are arranged so that a highly loaded portion of the connecting rod bearing eye is not provided with the at least two connecting rod body grooves.

2. The connecting rod according to claim 1,
    wherein the at least two connecting rod body grooves are offset from each other at an inner circumference of the crank bearing eye and arranged at least on a first portion of the inner circumference of the crank bearing eye in a portion of the connecting rod body to supply each respective inlet with the hydraulic fluid.

3. The connecting rod according to claim 1, wherein the at least two connecting rod body grooves are respectively arranged offset from a center longitudinal axis of the connecting rod body.

4. The connecting rod according to claim 1, wherein each respective inlet is connected with each of the at least two connecting rod body grooves.

5. The connecting rod according to claim 1, wherein each respective inlet includes at least one intersection in the connecting rod body between the two cylinders and the at least two connecting rod body grooves so that a fluid connection is provided between each respective inlet at the at least one intersection.

6. The connecting rod according to claim 1,
    wherein at least one connecting rod cover groove is arranged on at least one second portion of the inner circumference of the crank bearing eye in a portion of the connecting rod cover,
    wherein the at least one connecting rod cover groove is provided for hydraulically connecting the at least two connecting rod body grooves.

7. The connecting rod according to claim 1,
    wherein a bearing shell is arranged in the crank bearing eye,
    wherein one or two bearing shell grooves are arranged at least on a portion of an inner circumference of the bearing shell, and
    wherein the one or two bearing shell grooves provide a hydraulic connection of the at least two connecting rod body grooves of the connecting rod body with each other.

8. The connecting rod according to claim 1, wherein an adjustment travel of the eccentrical element adjustment device is adjustable by a switch valve.

9. The connecting rod according to claim 8,
    wherein the switch valve is provided for controlling a hydraulic fluid flow and displaceable into a first switching condition or a second switching condition,
    wherein a respective outlet of a first cylinder of the two cylinders is connected through the crank bearing eye of the connecting rod with the hydraulic fluid loop in the first switching position, and
    wherein an outlet of a second cylinder of the two cylinders is connected through the crank bearing eye of the connecting rod with the hydraulic fluid loop in the second switching position.

10. The connecting rod according to claim 8, wherein a valve housing of the switch valve is arranged at or in the connecting rod body or the connecting rod cover.

11. The connecting rod according to claim 8, wherein the valve housing is provided as an adapter at the connecting rod cover.

12. The connecting rod according to claim 8,
wherein each respective outlet extend from a respective cylinder bore hole through the connecting rod body and the connecting rod cover and leads into a respective drain conduit of the switch valve at a side of the connecting rod cover that is oriented away from the lift bearing eye.

13. The connecting rod according to claim 8, wherein at least one conduit is arranged in the connecting rod cover for connecting the switch valve with the at least one connecting rood cover groove of the crank bearing eye.

14. The connecting rod according to claim 9,
wherein a capture element of the switch valve is provided for controlling the hydraulic fluid flow in the switch valve, and
wherein the capture element is interlockable in the first switching condition or the second switching condition by a spring loaded interlocking element.

15. The connecting rod according to claim 14, wherein a spring of the interlocking element is at least partially supported in a recess of the connecting rod cover when the valve housing is mounted at the connecting rod cover.

16. A connecting rod for an internal combustion engine with variable compression with an eccentrical element adjustment device for adjusting an effective connecting rod length, the connecting rod comprising:
a connecting rod body; and
a connecting rod cover arranged at the connecting rod body,
wherein the connecting rod body and the connecting rod cover envelop a crank bearing eye,
wherein the eccentrical element adjustment device includes a cylinder with a piston that is displaceably supported in a cylinder bore hole and connected with a support rod,
wherein an inlet is provided for supplying hydraulic fluid to the cylinder,
wherein an outlet is provided for draining the hydraulic fluid from the cylinder,
wherein the connecting rod body includes two connecting rod body grooves for connecting the inlet with a hydraulic fluid loop,
wherein the two connecting rod body grooves are arranged so that a highly loaded portion of the connecting rod bearing eye is not provided with the two connecting rod body grooves.

* * * * *